United States Patent
Peiffer et al.

(10) Patent No.: US 8,557,027 B2
(45) Date of Patent: Oct. 15, 2013

(54) EPOXY-AMINE ACID GAS ADSORPTION-DESORPTION POLYMERS AND OLIGOMERS, PROCESSES FOR PREPARING SAME, AND USES THEREOF

(75) Inventors: Dennis G. Peiffer, Annandale, NJ (US); David C. Calabro, Bridgewater, NJ (US); Quanchang Li, Dayton, NJ (US); Mobae Afeworki, Phillipsburg, NJ (US); Stephen M. Cundy, Lebanon, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 155 days.

(21) Appl. No.: 13/332,576

(22) Filed: Dec. 21, 2011

(65) Prior Publication Data
US 2012/0160097 A1 Jun. 28, 2012

Related U.S. Application Data

(60) Provisional application No. 61/426,134, filed on Dec. 22, 2010.

(51) Int. Cl.
  *B01D 53/02* (2006.01)
  *B01D 53/62* (2006.01)
  *C08J 9/00* (2006.01)
(52) U.S. Cl.
  USPC ............................. 95/139; 423/230; 502/402
(58) Field of Classification Search
  USPC .................. 95/96, 97, 139, 148, 900; 96/108; 423/220, 228, 230; 502/400–402, 439
  See application file for complete search history.

(56) References Cited

U.S. PATENT DOCUMENTS

| | | | | |
|---|---|---|---|---|
| 3,646,594 A | * | 2/1972 | Lasky et al. | 95/106 |
| 4,675,309 A | * | 6/1987 | Hirai et al. | 502/402 |
| 5,876,488 A | * | 3/1999 | Birbara et al. | 96/111 |
| 8,470,074 B2 | * | 6/2013 | Baugh et al. | 95/139 |
| 2007/0149398 A1 | | 6/2007 | Jones et al. | |
| 2010/0300289 A1 | * | 12/2010 | Jiang | 95/136 |
| 2011/0296872 A1 | * | 12/2011 | Eisenberger | 62/640 |
| 2012/0164044 A1 | * | 6/2012 | Peiffer et al. | 423/228 |
| 2012/0164045 A1 | * | 6/2012 | Peiffer et al. | 423/228 |
| 2012/0216675 A1 | * | 8/2012 | Jiang et al. | 95/139 |

OTHER PUBLICATIONS

Alauzun et al.,"CO2 as a Supramolecular Assembly Agent: A Route for Lamellar Materials with a High Content of Amine Groups", JACS, 127, 11204 (2005).

(Continued)

*Primary Examiner* — Frank Lawrence, Jr.
(74) *Attorney, Agent, or Firm* — David M. Weisberg; Bruce M. Bordelon (57) ABSTRACT

This disclosure involves an adsorption-desorption material, e.g., crosslinked epoxy-amine material having an $M_w$ from about 500 to about $1\times10^6$, a total pore volume from about 0.2 cc/g to about 2.0 cc/g, and a $CO_2$ adsorption capacity of at least about 0.2 millimoles $CO_2$ per gram of crosslinked material, and/or linear epoxy-amine material having an $M_w$ from about 160 to about $1\times10^6$, a total pore volume from about 0.2 cc/g to about 2.0 cc/g, and a $CO_2$ adsorption capacity of at least about 0.2 millimoles $CO_2$ per gram of linear material. This disclosure also involves processes for preparing the crosslinked epoxy-amine materials and linear epoxy-amine materials, as well as selective removal of $CO_2$ and/or other acid gases from a gaseous stream using the epoxy-amine materials.

36 Claims, 6 Drawing Sheets

(56) References Cited

OTHER PUBLICATIONS

Sartori et al., "Sterically Hindered Amines for CO, Removal from Gases", Ind. Eng. Chem. Fundam., 22, 239 (1983).

Harlick et al., "Applications of Pore-Expanded Mesoporous Silica. 5. Triamine Grafted Material with Exceptional $CO_2$ Dynamic and Equilibrium Adsorption Performance", Ind. Eng. Chem. Res., 46, 446 (2007).

Harlick et al., "Applications of Pore-Expanded Mesoporous Silicas. 3. Triamine Silane Grafting for Enhanced $CO_2$ Adsorption", Ind. Eng. Chem. Res., 45, 3248 (2006).

Jadhav et al., "Monoethanol Amine Modified Zeolite 13X for $CO_2$ Adsorption at Different Temperatures", Energy & Fuels, 21, 3555 (2007).

Gray et al., "Improved immobilized carbon dioxide capture sorbents", Fuel Processing Technology, 86, 1449 (2005).

Yue et al., "$CO_2$ Capture by As-Prepared SBA-15 with an Occluded Organic Template", Adv. Fund. Mater. 16, 1717 (2006). ISSN: 1616-301X.

Li et al., "Preparation and Adsorption Properties of Polyethylenimine Containing Fibrous Adsorbent for Carbon Dioxide Capture", J. Appl. Poly. Sci., 108, 3851 (2008).

Hagg et al., "$CO_2$ Capture from Natural Gas Fired Power Plants by Using Membrane Technology" Ind. Eng. Chem. Res., 44, 7668 (2005).

Zou et al., "$CO_2$-selective polymeric membranes containing amines in crosslinked poly(vinyl alcohol)", J. Membr. Sci., 286, 310 (2006).

* cited by examiner

EPOXY-AMINE ACID GAS ADSORPTION-DESORPTION POLYMERS AND OLIGOMERS, PROCESSES FOR PREPARING SAME, AND USES THEREOF

This application claims the benefit of U.S. Provisional Application No. 61/426,134 filed Dec. 22, 2010.

BACKGROUND

1. Field of the Disclosure

This disclosure relates in part to adsorption-desorption materials, in particular, to crosslinked epoxy-amine materials, and linear epoxy-amine materials, and to processes for the preparation of these materials. This disclosure also relates in part to the use of these materials in the selective removal of $CO_2$ and/or other acid gases from a gaseous stream containing one or more of these gases.

2. Discussion of the Background Art

The selective removal of carbon dioxide from mixed gas streams is of great commercial value. Commercially, carbon dioxide may be used for reinjection into gas or liquid hydrocarbon deposits to maintain reservoir pressure and for enhanced product recovery. Due to the advanced age of many producing reservoirs worldwide and the ever-increasing challenge of meeting demand, the expanding use of enhanced oil recovery (EOR) methods is becoming more widespread.

Typically the source of carbon dioxide for EOR is the producing hydrocarbon stream itself, which may contain anywhere from less than 5% to more than 80% of $CO_2$. Additionally, it is desired to capture $CO_2$ from flue gas of various combustion sources, where the stream contains less than about 15% of $CO_2$ and its temperature is relatively high. Yet another need for $CO_2$ capture technology is for the pre-combustion capture of $CO_2$ from shifted syngas produced in fuel gasification processes.

Conventional methods for $CO_2$ capture include cryogenic distillation/condensation, absorption using liquid solvents, such as amine scrubbing, or sorption using solid sorbents, such as pressure swing adsorption (PSA) and/or temperature swing adsorption (TSA). However, with present technologies, all of these processes require a large temperature decrease of the gas stream to enable $CO_2$ condensation or sorption. Conventional methods (PSA, TSA, amine scrubbing) require $CO_2$ uptake at relatively low temperatures (e.g., less than 50° C.). Sorbent/solvent regeneration ($CO_2$ desorption) is accomplished by a step change decrease in $CO_2$ partial pressure (PSA), and/or by a temperature increase to above about 100° C. (TSA, amine scrubbing). In all of these cases, $CO_2$ capture costs depend significantly on the required heat exchange capacities and energy requirements for gas cooling/heating, the costs for steam generation for $CO_2$ desorption, and the high equipment and energy costs associated with $CO_2$ recompression.

Conventional amine scrubbing is based on the chemistry of $CO_2$ with amines to generate carbonate/bicarbonate and carbamate salts. Commercially, amine scrubbing typically involves contacting the $CO_2$ and/or $H_2S$ containing gas stream with an aqueous solution of one or more simple amines (e.g., monoethanolamine). The process requires high rates of gas-liquid exchange and the transfer of large liquid inventories between the absorption and regeneration steps and high energy requirements for the regeneration of amine solutions. This process is challenged by the corrosive nature of the amine solutions. These challenges limit the economic viability for large-scale applications (e.g., large combustion sources and power plants) utilizing conventional technologies.

The growing need to incorporate carbon capture and sequestration (CCS) into fossil fuel-based power generation, has triggered accelerating research into alternatives to conventional amine scrubbing technology. Cyclic adsorption technologies e.g., PSA and TSA) using solid adsorbents are also well-known in the gas purification industry. These processes avoid many of the limitations of amine scrubbing described above, but suffer from a lack of adsorbents having sufficiently selective $CO_2$ adsorption under the humid conditions always present in combustion flue gas, as well as the commercial viability of large scale operation.

Due to the ever increasing use of $CO_2$ re-injection for enhanced oil recovery, technology that reduces the cost of $CO_2$ capture directly reduces hydrocarbon production costs. In addition, if anticipated future restrictions on $CO_2$ emissions are mandated, a low cost method for $CO_2$ capture will be a critical need as a part of CCS.

Carbon dioxide is a ubiquitous and inescapable by-product of the combustion of hydrocarbons. In addition to the use of $CO_2$ for EOR, there is growing concern over its accumulation in the atmosphere and its role in global climate change. Therefore in addition to the commercial benefits of $CO_2$ recovery, environmental factors may soon require its capture and sequestration. For these reasons the separation of $CO_2$ from mixed gas streams is a rapidly growing area of research.

Therefore, a need exists for developing commercially viable alternative methods and adsorbent materials for the selective removal of $CO_2$ from gas mixtures, particularly adsorption technologies and adsorbent materials having economic viability for large-scale (e.g., large combustion sources and power plants) applications.

SUMMARY OF THE DISCLOSURE

This disclosure relates in part to an acid gas adsorption-desorption material comprising a crosslinked epoxy-amine material having a weight average molecular weight of from about 500 to about $1 \times 10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof.

This disclosure also relates in part to an acid gas adsorption-desorption material comprising a linear epoxy-amine material having a weight average molecular weight of from about 140 to about $1 \times 10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof.

This disclosure yet further relates in part to a process for preparing an acid gas adsorption-desorption material comprising a crosslinked epoxy-amine material having a weight average molecular weight of from about 500 to about $1 \times 10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof; the process comprising (i) reacting at least one epoxy material with at least one amine material under conditions sufficient to produce an epoxy-amine material, and (ii) crosslinking said epoxy-amine material under conditions sufficient to produce said crosslinked epoxy-amine material.

This disclosure also relates in part to a process for preparing an acid gas adsorption-desorption material comprising a linear epoxy-amine material having a weight average molecular weight of from about 140 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof; the process comprising reacting at least one epoxy material with at least one amine material under conditions sufficient to produce the linear epoxy-amine material.

This disclosure yet further relates in part to a method for adsorption-desorption of an acid gas comprising:

contacting a gas mixture containing at least one acid gas with an adsorbent material under conditions sufficient to cause adsorption of at least a portion of the acid gas, the adsorbent material comprising a crosslinked epoxy-amine material having a weight average molecular weight of from about 500 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorbent material, or mixtures thereof; and treating the adsorbent material under conditions sufficient to cause desorption of at least a portion of the acid gas.

This disclosure also relates in part to a method for adsorption-desorption of an acid gas comprising:

contacting a gas mixture containing at least one acid gas with an adsorbent material under conditions sufficient to cause adsorption of at least a portion of the acid gas, the adsorbent material comprising a linear epoxy-amine material having a weight average molecular weight of from about 140 to about $1\times10^6$, a total pore volume of from about 0.2 cubic centimeters per gram (cc/g) to about 2.0 cc/g, and an adsorption capacity of at least 0.2 millimoles of $CO_2$ adsorbed per gram of adsorbent material, or mixtures thereof; and treating the adsorbent material under conditions sufficient to cause desorption of at least a portion of the acid gas.

This disclosure further relates in part to a method for adsorption-desorption of carbon dioxide comprising:

contacting a gas mixture containing at least carbon dioxide with an adsorbent material under conditions sufficient to cause adsorption of at least a portion of the carbon dioxide, the adsorbent material comprising a crosslinked epoxy-amine material having a weight average molecular weight of from about 500 to about $1\times10$, a total pore volume of from about 0.2 cubic centimeters per gram (cc/g) to about 2.0 cc/g, and an adsorption capacity of at least about 0.2 millimoles of $CO_2$ adsorbed per gram of adsorbent material, or mixtures thereof; and treating the adsorbent material under conditions sufficient to cause desorption of at least a portion of the carbon dioxide.

This disclosure yet further relates in part to a method for adsorption-desorption of carbon dioxide comprising:

contacting a gas mixture containing at least carbon dioxide with an adsorbent material under conditions sufficient to cause adsorption of at least a portion of the carbon dioxide, the adsorbent material comprising a linear epoxy-amine material having a weight average molecular weight of from about 140 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorbent material, or mixtures thereof; and treating the adsorbent material under conditions sufficient to cause desorption of at least a portion of the carbon dioxide.

This disclosure also relates in part to a method of separating carbon dioxide from a gas mixture comprising:

providing at least one adsorption zone comprising an adsorbent, the adsorbent comprising a crosslinked epoxy-amine material having a weight average molecular weight of from about 500 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorbent material, or mixtures thereof;

passing the gas mixture comprising at least carbon dioxide through the at least one adsorption zone, wherein the adsorbent adsorbs at least part of the carbon dioxide from the mixture to provide a carbon dioxide-depleted gas; and regenerating the adsorbent to provide a carbon dioxide-rich gas.

This disclosure further relates in part to a method of separating carbon dioxide from a gas mixture comprising:

providing at least one adsorption zone comprising an adsorbent, the adsorbent comprising a linear epoxy-amine material having a weight average molecular weight of from about 140 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorbent material, or mixtures thereof;

passing the gas mixture comprising at least carbon dioxide through the at least one adsorption zone, wherein the adsorbent adsorbs at least part of the carbon dioxide from the mixture to provide a carbon dioxide-depleted gas; and regenerating the adsorbent to provide a carbon dioxide-rich gas.

The adsorbent materials useful in this disclosure have the advantage of recovery of $CO_2$ at low pressure, low capital costs, low propensity for corrosion, and low regeneration energy compared to conventional processes where a large amount of energy is required to heat the aqueous amine solution.

The adsorbent material useful in this disclosure possesses high $CO_2$ uptake capacity at temperatures from about 20° C. to about 160° C. This is significantly higher temperatures than where most conventional sorbents can operate. At these higher temperatures, where conventional sorbents (e.g., liquid amines, zeolites, and carbons) usually undergo $CO_2$ desorption, the adsorbent material of this disclosure exhibits substantial and quite rapid $CO_2$ uptake. Complete $CO_2$ desorption can be accomplished by a partial pressure swing, wherein the $CO_2$-containing feed gas is replaced in the desorption step with an essentially $CO_2$-free or low $CO_2$ content purge gas or fluid under essentially isothermal conditions. Using this $CO_2$ sorbent material, the need for temperature cycling is minimized and a rapid cycle partial pressure swing adsorption can be carried out at much higher temperature, as well as essentially isothermal conditions than practiced with conventional sorbents, thereby greatly reducing the heat exchange cost of $CO_2$ separation.

As used herein, "essentially isothermal conditions" means at or about the same temperature. In a preferred embodiment, the adsorption-desorption processes of this disclosure are carried out under essentially isothermal conditions.

Further objects, features and advantages of the present disclosure will be understood by reference to the following drawings and detailed description.

DETAILED DESCRIPTION OF THE PREFERRED EMBODIMENT

The acid gas adsorption-desorption materials of this disclosure comprise in part crosslinked epoxy-amine polymeric materials. The crosslinked epoxy-amine materials have a weight average molecular weight of from about 500 to about $1 \times 10^6$, preferably a weight average molecular weight of from about 600 to about $1 \times 10^5$, and more preferably a weight average molecular weight of from about $1 \times 10^3$ to about $5 \times 10^4$. The crosslinked epoxy-amine materials have an adsorption capacity of at least about 0.2 millimoles of $CO_2$ adsorbed per gram of adsorption-desorption material, preferably an adsorption capacity of at least about 0.5 millimoles of $CO_2$ adsorbed per gram of adsorption-desorption material, and more preferably an adsorption capacity of at least about 1.0 millimoles of $CO_2$ adsorbed per gram of adsorption-desorption material. This disclosure also includes mixtures of the crosslinked epoxy-amine materials.

Illustrative crosslinked epoxy-amine materials of this disclosure have a formula selected from:

wherein x is an integer greater than about 1.0, y is an integer greater than about 0, and n is an integer equal to or greater than about 1.0, the $CH_2CH_2NH$ and $NHCH_2CH_2$ groups can be linear or branched, and R is the same or different and is an alkyl or aryl moiety. The structure can be terminated with either of the starting monomers as well as monofunctional amities and monofunctional aryl and/or alkyl epoxides.

Figure 2:
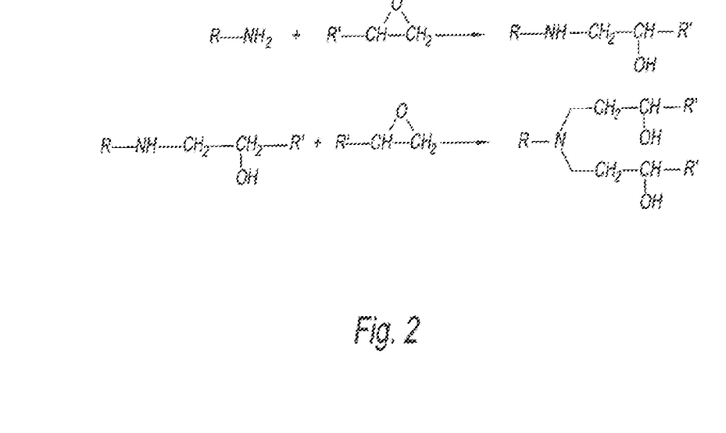
FIG. 2 depicts an approach for forming hypercrosslinked polyethyleneimines using epoxy-amine chemistry. In the depicted reactions, primary amines react with epoxy compounds to produce secondary amines, and secondary amities react with epoxy compounds to produce tertiary amines (with corresponding alcohol groups).
Figure 3:
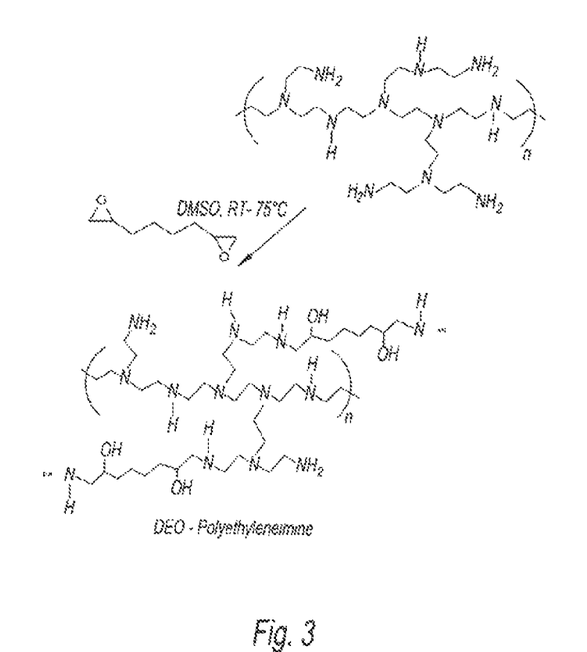
FIG. 3 depicts chain growth reactions for amine-rich polymers. The polyethyleneimine starting material is a commercially available, cationic flocculent, highly amine-rich building block. The product is solid Flexsorb™ adsorbent.

Illustrative crosslinked epoxy-amine materials of this disclosure are depicted in FIGS. 2 and 3. These materials can be formed as bulk solids, films, membranes, and particulates.

As used herein, "crosslinked" means polymer chains that are connected to one another through bonds. Crosslinks are bonds that link one polymer chain to another. When the polymer chains are connected to each other, they lose some of their ability to move as independent polymer chains.

Preferably the crosslinked epoxy-amine polymer materials of this disclosure have an average particle diameter of from about 0.1 microns to about 500 microns, more preferably from about 1.0 microns to about 100 microns, and even more preferably from about 2.0 microns to about 50 microns. Preferably the crosslinked epoxy-amine polymer materials of this disclosure have a total pore volume of from about 0.2 cubic centimeters per gram (cc/g) to about 2 cc/g, more preferably from about 0.4 cc/g to about 2 cc/g, and even more preferably from about 0.5 cc/g to about 2 cc/g, as measured by mercury porsimetry in cubic centimeters of pore volume per gram of the porous crosslinked epoxy-amine materials, for all pores having a diameter of 0.005 microns to 10 microns.

Preferably the crosslinked epoxy-amine polymer materials of this disclosure have an average pore size of from about 0.01 microns to about 1000 microns, more preferably from about 0.1 microns to about 100 microns, and even more preferably from about 1.0 microns to about 10 microns. Preferably the crosslinked epoxy-amine polymer materials of this disclosure have a surface area of from about 5 square meters per gram ($m^2/g$) to about 50 $m^2/g$, more is preferably from about 20 $m^2/g$ to about 50 $m^2/g$, and even more preferably from about 25 $m^2/g$ to about 50 $m^2/g$, as measured by mercury porsimetry.

The crosslinked epoxy-amine materials of this disclosure can be prepared by a process that involves reacting at least one epoxy material with at least one amine material under conditions sufficient to produce the crosslinked epoxy-amine material. In particular, the crosslinked epoxy-amine materials can be produced by reacting at least one diepoxy functional compound, triepoxy functional compound, tetraepoxy functional compound, or mixtures thereof, with at least one linear amine, branched amine, polyamine, or mixtures thereof, under conditions sufficient to produce the crosslinked epoxy-amine material. In a more preferred embodiment, the crosslinked epoxy-amine materials can be produced by reacting at least one monoepoxy functional compound in addition to the diepoxy functional compound, triepoxy functional compound, tetraepoxy functional compound, or mixtures thereof.

FIG. 2 depicts an approach for forming hypercrosslinked polyethyleneimines using epoxy-amine chemistry. In the reactions depicted in FIG. 2, primary amines react with epoxy compounds to produce secondary amines, and secondary amines react with epoxy compounds to produce tertiary amines (with corresponding alcohol groups). The approach is applicable for forming functionalized, lightly or moderately crosslinked, polyamine. Many combinations are permissible, for example, functionality modifications (mono-, di-, tri- and tetra-) and geometric modifications (linear, branched, dendritic, and hyperbranched). The products can have a wide range of structures, functionalities and crosslink densities.

FIG. 3 depicts chain growth reactions for amine-rich polymers. The polyethyleneimine starting material is a commercially available, cationic flocculent, highly amine-rich building block. The product is solid Flexsorb™ adsorbent.

Illustrative epoxy starting materials useful in making the crosslinked epoxy-amine materials of this disclosure may be selected from a wide variety of materials known in the art. Illustrative epoxy materials include, for example, monoepoxy functional compounds, diepoxy functional compounds, triepoxy functional compounds, tetraepoxy functional compounds, and mixtures thereof. Preferably, the epoxy starting material is a diepoxy functional compound selected from diglycidyl hexadecyl ether, 1,2-epoxy-3-phenoxypropane, and the like; a triepoxy functional compound selected from triphenylolmethane triglycidyl ether, trimethylolpropane triglycidyl ether, and the like; a tetraepoxy functional compound selected from tetraphenylolethane glycidyl ether, and the like; and mixtures thereof. In a more preferred embodiment, the epoxy starting material also contains a monoepoxy functional compound selected from tetraphenylolethane glycidyl ether, bisphenol A (2,3-dihydroxypropyl glycidyl ether), dodecyl glycidyl ether, tetradecyl glycidyl ether, tertbutyl glycidyl ether, glycidyl 2,2,3,3,4,4,5,5-octafluoropentyl glycidyl ether, and the like, in addition to the at least one diepoxy functional compound, triepoxy functional compound, tetraepoxy functional compound, or mixtures thereof.

The epoxy materials can be prepared by conventional methods known in the art and/or are commercially available.

Illustrative amine starting materials useful in making the crosslinked epoxy-amine materials of this disclosure may be selected from a wide variety of materials known in the art. Illustrative amine materials include, for example, primary amines, secondary amines, and mixtures thereof. Suitable polyamines include, lbr example, linear polyamines, branched polyamines, polyalkyleneimines, and mixtures thereof. Preferably, the amine is selected from propylenediamine, tetraethylenepentaamine, brandied and linear polyethyleneimines, and mixtures thereof. The amine materials can be prepared by conventional methods known in the art and/or are commercially available.

Figure 4:
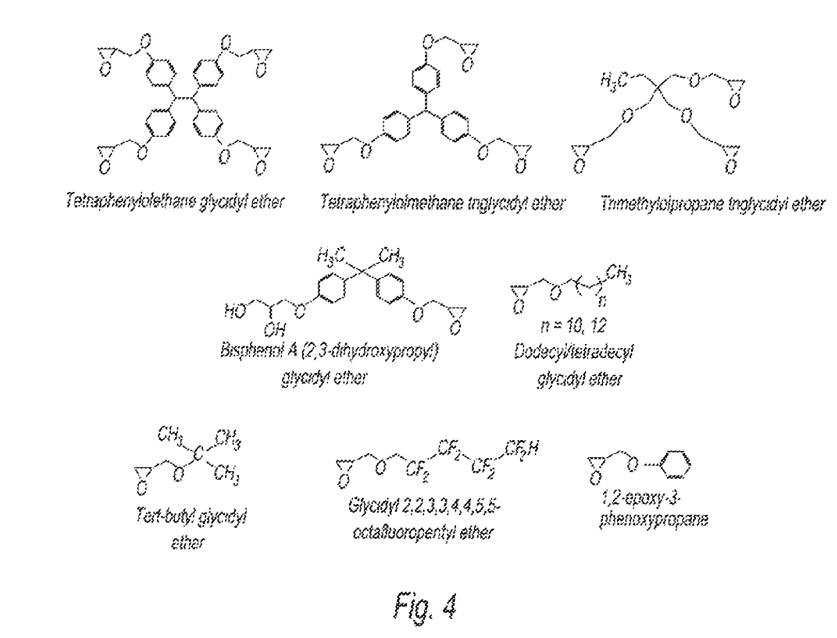
FIG. 4 depicts a variety of polyethyleneimine crosslinkers.

A wide variation of polyethyleneimine crosslinkers can be useful in this disclosure. Crosslinker modifications and network functionality can provide enhanced performance. The crosslinker structure can be varied (tri-/tetra-functional crosslinkers) as well as the crosslink density. Monofunctional reactants can be incorporated as potential structure disruptors and/or pore modifiers for functionality control. Illustrative crosslinkers are depicted in FIG. 4. Other illustrative crosslinkers include, for example, 1,2,5,6-diepoxycyclooctane, 1,2,7,8-diepoxyoctane, glycerol diglycidyl ether, bisphenol A diglycidyl ether, 1,4-butanediol diglycidyl ether, 1,4-cyclohexanedimethanol diglycidyl ether, hisphenol F diglycidyl ether, neopentyl glycol diglycidyl ether, 1,3-butadiene diepoxide, polypropylene glycol) diglycidyl ether (Mn of about 380 g/mol), and the like.

One or more porogens may also be used as a component material in the fabrication processes and crosslinked polymers of this disclosure. An interpenetrating network of holes, closed cells or a combination thereof can be achieved in the crosslinked polymers of this disclosure by polymerization in the presence of an insoluble material such as a porogen. Subsequent removal of the porogen gives rise to interstices throughout the formed crosslinked polymer material. Porogen concentrations in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes. Illustrative porogens include, for example, xylene, toluene, polyvinylpyrrolidinone, and mixtures thereof. The porogens can be prepared by conventional methods known in the art and/or are commercially available.

The concentration of the epoxy starting material in the process of this disclosure can vary over a wide range, and need only be that minimum amount necessary to react with the amine starting material and to provide the crosslinked epoxy-amine materials of this disclosure. In general, depending on the size of the reaction mixture, epoxy starting material concentrations in the range of from about 1 weight percent to about 75 weight percent, preferably from about 5 weight percent to about 50 weight percent, and more preferably from about 10 weight percent to about 30 weight percent, with respect to the overall reaction mixture, should be sufficient for most processes.

The concentration of the amine starting material in the process of this disclosure can vary over a wide range, and need only be that minimum amount necessary to react with the epoxy starting material and to provide the crosslinked epoxy-amine materials of this disclosure. In general, depending on the size of the reaction mixture, amine starting material concentrations in the range of from about 1 weight percent to about 75 weight percent, preferably from about 5 weight percent to about 50 weight percent, and more preferably from about 10 weight percent to about 30 weight percent, with respect to the overall reaction mixture, should be sufficient for most processes.

The concentration of the crosslinkers in the process of this disclosure can vary over a wide range, and need only be that minimum amount necessary to achieve desired crosslinking in the crosslinked epoxy-amine materials of this disclosure. In general, depending on the size of the reaction mixture, concentrations of crosslinkers in the range of from about 0.5 weight percent to about 50 weight percent, preferably from about 1.0 weight percent to about 40 weight percent, and more preferably from about 2.0 weight percent to about 30 weight percent, with respect to the overall reaction mixture, should be sufficient for most processes.

The concentration of the one or more porogens in the process of this disclosure can vary over a wide range, and need only be that minimum amount necessary to achieve desired pore volume in the crosslinked epoxy-amine polymer materials of this disclosure. In general, depending on the size of the reaction mixture, concentrations of porogens in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes.

Reaction conditions for the reaction of the epoxy starting material with the amine starting material, such as temperature, pressure and contact time, may vary greatly. Any suitable combination of such conditions may be employed herein that are sufficient to produce the crosslinked epoxy-amine materials of this disclosure. Preferred reaction pressure is ambient pressure. Preferred reaction temperatures can range from about 0° C. to about 150° C., preferably from about 25° C. to about 95° C. The preferred reaction time of the epoxy material with the amine can range from about 60 seconds to about 48 hours. In an embodiment, the reaction is carried out under ambient pressure and the contact time may vary from a matter of seconds or minutes to a few hours or greater. The reactants can be added to the reaction mixture or combined in any order. The stir time employed is preferably from about 1 minute to about 48 hours, more preferably from about 1 to about 24 hours, and even more preferably from about 2 to about 8 hours. Isolation of the crosslinked epoxy-amine materials may be achieved by any techniques known in the art, such as solvent evaporation or nonsolvent extraction and other conventional procedures, to afford the final material.

The acid gas adsorption-desorption materials of this disclosure comprise in part linear epoxy-amine polymeric materials. The linear epoxy-amine materials have a weight average molecular weight of from about 140 to about $1 \times 10^6$, preferably a weight average molecular weight of from about 400 to about $1 \times 10^5$, and more preferably a weight average molecular weight of from about 600 to about $1 \times 10^4$. The linear epoxy-amine materials have an adsorption capacity of at least about 0.2 millimoles of $CO_2$ adsorbed per gram of adsorption-desorption material, preferably an adsorption capacity of at least about 0.5 millimoles of $CO_2$ adsorbed per gram of adsorption-desorption material, and more preferably an adsorption capacity of at least about 1.0 millimoles of $CO_2$ adsorbed per gram of adsorption-desorption material. This disclosure also includes mixtures of the linear epoxy-amine materials.

Illustrative linear epoxy-amine materials of this disclosure have a formula selected from:

wherein x is an integer greater than about 1.0, y is an integer greater than about 0, and n is an integer equal to or greater than about 1.0, the $CH_2CH_2NH$ and $NHCH_2CH_2$ groups can be linear or branched, and R is the same or different and is an alkyl or aryl moiety. The structure can be terminated with either of the starting monomers as well as monofunctional amines and monofunctional aryl and/or alkyl epoxides.

The composition of the linear epoxy-airline materials of this disclosure, including all polymers, copolymers and terpolymers thereof, can vary over a wide range, and need only be that amount necessary to provide the desired adsorption-desorption properties. These materials can be formed as bulk solids, films, membranes, and particulates.

Preferably the linear epoxy-amine polymer materials of this disclosure have an average particle diameter of from about 0.1 microns to about 500 microns, more preferably from about 1.0 microns to about 100 microns, and even more preferably from about 2.0 microns to about 50 microns. Preferably the linear epoxy-amine polymer materials of this disclosure have a total pore volume of from about 0.2 cubic centimeters per gram (cc/g) to about 2 cc/g, more preferably from about 0.4 cc/g to about 2 cc/g, and even more preferably from about 0.5 cc/g to about 2 cc/g, as measured by mercury porsimetry in cubic centimeters of pore volume per gram of the porous linear epoxy-amine materials, for all pores having a diameter of 0.005 microns to 10 microns.

Preferably the linear epoxy-amine polymer materials of this disclosure have an average pore size of from about 0.01 microns to about 1000 microns, more preferably from about 0.1 microns to about 100 microns, and even more preferably from about 1.0 microns to about 10 microns. Preferably the linear epoxy-amine polymer materials of this disclosure have a surface area of from about 5 square meters per gram ($m^2/g$) to about 50 $m^2/g$, more preferably from about 20 $m^2/g$ to about 50 $m^2/g$, and even more preferably from about 25 $m^2/g$ to about 50 $m^2/g$, as measured by mercuiy porsimetry.

The linear epoxy-amine materials of this disclosure can be prepared by a process that involves reacting at least one epoxy material with at least one amine material under conditions sufficient to produce the linear epoxy-amine material. In particular, the linear epoxy-amine materials can be produced by reacting at least one diepoxy functional compound, triepoxy functional compound, tetraepoxy functional compound, or mixtures thereof, with at least one linear amine, or mixtures thereof, under conditions sufficient to produce the linear epoxy-amine material. In a more preferred embodiment, the linear epoxy-amine materials can be produced by reacting at least one monoepoxy functional compound in addition to the diepoxy functional compound, triepoxy functional compound, tetraepoxy functional compound, or mixtures thereof.

Illustrative epoxy starting materials useful in making the linear epoxy-amine materials of this disclosure may be selected from a wide variety of materials known in the art. Illustrative epoxy starting materials include, for example, monoepoxy functional compounds, diepoxy functional compounds, triepoxy functional compounds, tetraepoxy functional compounds, and mixtures thereof. Preferably, the epoxy starting material is a diepoxy functional compound selected from diglycidyl hexadecyl ether, 1,2-epoxy-3-phenoxypropane, and the like; a triepoxy functional compound selected from triphenylolmethane triglycidyl ether, trimethylolpropane triglycidyl ether, and the like; a tetraepoxy functional compound selected from tetraphenylolethane glycidyl ether, and the like; and mixtures thereof. In a more preferred embodiment, the epoxy starting material also contains a monoepoxy functional compound selected from tetraphenylolethane glycidyl ether, bisphenol. A (2,3-dihydroxypropyl glycidyl ether), dodecyl glycidyl ether, tetradecyl glycidyl ether, tert-butyl glycidyl ether, glycidyl 2,2,3,3,4,4,5,5-octafluoropentyl glycidyl ether, and the like, in addition to the at least one diepoxy functional compound, triepoxy functional compound, tetraepoxy functional compound, or mixtures thereof. The epoxy starting materials can be prepared by conventional methods known in the art and/or are commercially available.

Other illustrative epoxy starting materials include, for example, 1,2,5,6-diepoxycyclooctane, 1,2,7,8-diepoxyoctane, glycerol diglycidyl ether, bisphenol A diglycidyl ether, 1,4-butanediol diglycidyl ether, 1,4-cyclohexanedimethanol diglycidyl ether, bisphenol F diglycidyl ether, neopentyl glycol diglycidyl ether, 1,3-butadiene diepoxide, poly(propylene glycol) diglycidyl ether (Mn of about 380 g/mol), and the like. Still other illustrative epoxy starting materials are depicted in FIG. 4.

Illustrative amine starting materials useful in making the linear epoxy-amine materials of this disclosure may be selected from a wide variety of materials known in the art. Illustrative amine starting materials include, for example, primary amities, secondary amities, and mixtures thereof. Suitable polyamines include, for example, linear polyamines, branched polyamines, polyalkyleneimines, and mixtures thereof. Preferably, the amine is selected from propylenediamine, tetraethylenepentaamine, linear polyethyleneimines, and mixtures thereof. The amine starting materials can be prepared by conventional methods known in the art and/or are commercially available.

One or more porogens may also be used as a component material in the fabrication processes and linear polymers of this disclosure. An interpenetrating network of holes, closed cells or a combination thereof can be achieved in the linear polymers of this disclosure by polymerization in the presence of an insoluble material such as a porogen. Subsequent removal of the porogen gives rise to interstices throughout the formed linear polymer material. Porogen concentrations in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes. Illustrative porogens include, for example, xylene, toluene, polyvinylpyrrolidinone, and mixtures thereof. The porogens can be prepared by conventional methods known in the art and/or are commercially available.

The concentration of the epoxy starting material in the process of this disclosure can vary over a wide range, and need only be that minimum amount necessary to react with the amine starting material and to provide the linear epoxy-amine materials of this disclosure. In general, depending on the size of the reaction mixture, epoxy starting material concentrations in the range of from about 1 weight percent to about 75 weight percent, preferably from about 5 weight percent to about 50 weight percent, and more preferably from about 10 weight percent to about 30 weight percent, with respect to the overall reaction mixture, should be sufficient for most processes.

The concentration of the amine starting material in the process of this disclosure can vary over a wide range, and need only be that minimum amount necessary to react with the epoxy starting material and to provide the linear epoxy-amine materials of this disclosure. In general, depending on the size of the reaction mixture, amine starting material concentrations in the range of from about 1 weight percent to about 75 weight percent, preferably from about 5 weight percent to about 50 weight percent, and more preferably from about 10 weight percent to about 30 weight percent, with respect to the overall reaction mixture, should be sufficient for most processes.

The concentration of the one or more porogens in the process of this disclosure can vary over a wide range, and need only be that minimum amount necessary to achieve desired pore volume in the linear epoxy-amine polymer materials of this disclosure. In general, depending on the size of the reaction mixture, concentrations of porogens in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes.

Reaction conditions for the reaction of the epoxy starting material with the amine starting material, such as temperature, pressure and contact time, may vary greatly. Any suitable combination of such conditions may be employed herein that are sufficient to produce the linear epoxy-amine materials of this disclosure. Preferred reaction pressure is less than 100 psig. More preferably, the reaction pressure is approximately ambient (atmospheric) pressure. Preferred reaction temperatures can range from about 0° C. to about 150° C., more preferably from about 25° C. to about 95° C. The preferred reaction time of the epoxy material with the amine can range from about 60 seconds to about 48 hours. In an embodiment, the reaction is carried out under ambient pressure and the contact time may vary from a matter of seconds or minutes to a few hours or greater. The reactants can be added to the reaction mixture or combined in any order. The stir time employed is preferably from about 1 minute to about 48 hours, more preferably from about 1 to about 24 hours, and even more preferably from about 2 to about 8 hours. Isolation of the linear epoxy-amine materials may be achieved by any techniques known in the art, such as solvent evaporation, nonsolvent extraction, and other conventional methods, to afford the final material.

The method of this disclosure involves removing $CO_2$ and/or other acid gases, such as $H_2S$, from a gaseous stream containing one or more of these gases. The method of this disclosure is based on the selective adsorption of a gas mixture and involves contacting the gas mixture with a selective adsorbent in an adsorption zone. The adsorption zone is maintained at adsorption conditions (i.e., temperature and/or pressure) favorable to selectively adsorbing a component of the gas mixture and producing an adsorption effluent, which has reduced concentration of the adsorbed component relative to the gas mixture. Subsequently, the adsorbed component is then desorbed by changing the conditions in the adsorption zone to induce desorption. Alternatively, the selective adsorbent can be moved from the adsorption zone to a desorption zone having conditions favorable for desorption. Under desorption conditions, at least a portion of the adsorbed component is desorbed from the selective adsorbent. Following the desorptive step, the adsorption zone may be further purged with a purge gas to further remove the adsorbed component.

Once the adsorbent has been synthesized, it can be employed in a sorbent bed for use the adsorption-desorption process. Preferably, the adsorbent of this disclosure may be formed into a stable, mechanically strong form. These forms may include, for example, pellet forms or monolithic structures. The selection of the appropriate form is based on the application of the adsorbent and the type of equipment used. After the adsorbent form is selected and manufactured, it is used in a sorbent bed where a gaseous stream containing $CO_2$ contacts the adsorbent. In the adsorption process, the $CO_2$ and amine chemically react to form an amine complex, thereby removing the $CO_2$ from the gaseous stream.

After the adsorbent is loaded with $CO_2$, to a satisfactory level, for example, when greater than 80 percent of the amine has been converted to the amine complex, or at a designated cycle time, the adsorbent can be regenerated. Regeneration involves ceasing the flow of the gaseous stream through the bed and desorbing the adsorbed $CO_2$. The desorption can be accomplished by controlled temperature swing, pressure swing, partial pressure swing, or by the use of a sweeping or purge gas, or any combination thereof. During this step, the amine complex is dissociated, and $CO_2$ removed and the amine is freed and ready for re-use. In a preferred embodiment, the adsorption-desorption is carried out under essentially isothermal conditions.

The adsorbent material of this disclosure comprises a crosslinked epoxy-amine material or a linear epoxy-amine material. Suitable crosslinked epoxy-amine materials and linear epoxy-amine materials of this disclosure are described more fully herein.

The adsorbent material has an adsorption capacity of at least about 0.2 millimoles, preferably at least about 0.5 millimoles, and more preferably at least about 1.0 millimoles, of $CO_2$ adsorbed per gram of adsorbent when measured by a thermal gravimetric apparatus using a dry gas stream containing $CO_2$ (about 0.7 atmosphere partial pressure) and an inert gas. The adsorbent can be regenerated from one cycle to another in cycling adsorption processes, and thus the adsorbent is cyclically stable.

The adsorption beds can be configured in a variety of ways, for example, moving beds and fixed beds. The configuration is preferably fixed bed wherein the bed is fixed relative to the flow of the feedstream through the bed. In a moving bed configuration, the adsorbent in the adsorption bed and the gas mixture move through the adsorption zone in a continuous manner. Then the adsorbent is moved from the adsorption zone into the desorption zone.

In the preferred fixed bed configuration, the bed is fixed in a certain area of the cyclic adsorption apparatus and contains the adsorbent. The gas mixture passes through the fixed bed while under adsorption zone conditions. After a period of time when the adsorbent adsorbs a portion of the gas mixture, the conditions are changed in the area that includes the fixed bed to desorption zone conditions to desorb the adsorbed gases. Many cyclic adsorption apparatus configurations can include two or more fixed beds in separate regions or the apparatus, so that while one fixed bed is under adsorption conditions, the other fixed bed is under desorption conditions. Therefore, the gas stream can be operated in a continuous manner.

In general, for temperature swing adsorption processes, the temperature in the adsorption zone is lower than the temperature in the desorption zone, while the pressure is substantially constant. For pressure swing adsorption processes, the pressure in the adsorption zone is greater than the pressure of the desorption zone, while the temperature is substantially constant.

The temperature of the adsorption zone for cyclic adsorption processes depends upon a number of factors, such as the particular hydrocarbons present in the gas mixture being separated, the particular adsorbent being used, and the pressure at which the adsorption step is carried out. The upper and lower temperatures at which the adsorption zone is maintained is, in part, determined by both economics and the chemical reactivity of the components in the gas mixture. In particular, the temperature at which the adsorption zone is maintained should be below the temperature at which the gas mixture components undergo chemical reaction (e.g., hydrocarbons undergoing oligomerization and polymerization).

For the adsorption processes of this disclosure, the temperature of the inlet stream is preferably in the range of from about 20° C. to about 150° C., more preferably from about 75° C. to about 125° C., and even more preferably greater than about 80° C. In a preferred embodiment, the adsorption-desorption is carried out under essentially isothermal conditions. The pressure during adsorption is preferably in the range of from about 0.1 bar to about 300 bar (absolute), more preferably from about 0.1 bar to about 150 bar (absolute). The partial pressure of carbon dioxide in the gas mixture is preferably from about 0.1 to about 150 bar, more preferably from about 0.1 to about 20 bar, and even more preferably from about 0.1 to about 10 bar (absolute). The gas mixture can be contacted with the adsorbent bed material at a gas hourly space velocity (GHSV) of from about 200 to about 50,000 GHSV. The gas mixture can be contacted with the adsorbent material in the processes of this disclosure one or more times.

The carbon dioxide can be desorbed from the adsorbent material by any conventional methods. One possibility is to desorb the carbon dioxide by means of a helium purge. Other possibilities include pressure swing adsorption including partial pressure swing adsorption, thermal swing adsorption, rapid cycle partial pressure swing adsorption, or any combination thereof.

For desorption, suitable pressures can range from preferably about 50 millibar to about 75 bar absolute), more preferably from about 50 millibar to about 3 bar (absolute), even more preferably from about 100 millibar to about 1.5 bar (absolute). The temperature is preferably in the range of from about 50° C. to about 150° C., more preferably from about 75° C. to about 125° C., and even more preferably greater than about 80° C. In a preferred embodiment, the adsorption-desorption is carried out under essentially isothermal conditions.

For temperature swing adsorption processes, adsorbent regeneration is carried out at a temperature higher than the adsorption temperature and below the temperature at which undesired reactions of the components of the gas mixture take place. For temperature swing adsorption processes, the adsorbent regeneration temperature is typically in the range of about 40° C. to less than about 200° C., preferably from about 60° C. to about 140° C. The pressures at Which the adsorption and adsorbent regeneration steps are carried out are not critical for temperature swing adsorption processes, and in general these steps can be carried out at any of the usual pressures employed for cyclic adsorption processes.

It is understood that the adsorbent is not limited to use for the removal of $CO_2$ from a gaseous stream. Rather the adsorbent can be used for the removal of any acid gas, or combination thereof, from a gaseous stream, provided that the acid gas is capable of reaction with amines.

The gas mixture containing carbon dioxide can originate from a natural or artificial source. The gas mixture can contain in addition to carbon dioxide, one or more other gases such as methane, ethane, n-butane, i-butane, hydrogen, carbon monoxide, ethene, ethyne, propene, nitrogen, oxygen, helium, neon, argon, krypton, and hydrogen sulfide.

The constituents of the gas mixture may have different proportions. The amount of carbon dioxide in the gas mixture is preferably at least 1 percent by volume, more preferably at least 10 percent by volume, and even more preferably 50 percent by volume or greater. The gas mixture can be any of a variety of gases, for example, natural gas, flue gas, fuel gas, waste gas and air.

The contacting of the gas mixture can be carried out by continuous adsorption on a fixed bed. The gas mixture is passed through the fixed adsorbent bed. Continuous adsorption can take place in two or more adsorbent beds in which at least one of the adsorbent beds contains the crosslinked epoxy-amine material or linear epoxy-amine material or a combination thereof The gas mixture can be subject to dehumidification prior to contacting with the adsorbent material. The dehumidification can be carried out by conventional methods. For example, the dehumidification can be carried out by adsorption over fixed bed reactors containing solid sorbents. Preferred solid sorbents include, for example, molecular sieves, silica gels or aluminas.

It will be appreciated that conventional equipment can be used to perform the various functions of the cyclic processes, such as monitoring and automatically regulating the flow of gases within the cyclic adsorption system so that it can be fully automated to run continuously in an efficient manner.

Various modifications and variations of this disclosure will be obvious to a worker skilled in the art and it is to be understood that such modifications and variations are to be included within the purview of this application and the spirit and scope of the claims.

EXAMPLE 1

The reaction of monoepoxy compounds with tetraethylenepentaamine (TEPA) produces an essentially linear structure, while the reaction with a polyethyleneimine produces a hyperbranched molecular structure. The level of functionalization is directly related to the initial stoichiometry ratio of monoepoxy, TEPA, and the polyethyleneimine, as well as the reaction temperature. Under specific reaction conditions, essentially linear polymers will be produced via reactions with diepoxy compounds with linear polyamines. These unique polymeric materials will be soluble in aqueous solutions and therefore possess enhanced performance over the conventional and commercially available nonpolymeric (i.e., low molecular weight) aminoalcohol linear varieties (i.e., Flexsorb® technology). For example, the linear polymeric sorbents possess significantly lower vapor pressure which results in significantly lower material losses. In addition, these sorbents are less corrosive and possess markedly facile possessing overall. Chemically crosslinked polymers are produced with the reactions of multifunctional epoxy compounds with branched polyamines, e.g., polyethyleneimines.

The reactions of diepoxy, triepoxy, and tetraepoxy functionalities with the amine and polyamine structures and their associated mixtures produce a wide variety of linear, branched and chemically crosslinked structures useful in the methods of this disclosure. The molecular weight as well as the polymeric microstructure can be controlled via the controlled addition of monoepoxides and/or monoamines. These compounds control the molecular weight and microstructure through end-capping/chain terminating mechanisms.

The reaction of epoxy compounds with primary amities produces secondary amities, and the reaction of epoxy compounds with secondary amities produces tertiary amines. Low temperatures can be used to facilitate the formation of secondary amities. Elevated temperature reactions produce a wider variety of primary, secondary and tertiary amine functionality.

EXAMPLE 2

Starting Reagents
TMPTGE: Trimethylotpropane triglycidyl ether (Aldrich)
Polyethyleneimine (Mn=423, and Mn=600, Aldrich)
Samples were prepared with TMPTGE and a polyethyleneimine (Mn=423) with molar ratio of 2:3. A clear solution was formed by dissolving 21 grams of the polyethyleneimine in 24 grams of toluene. With stirring, 10 grams of TMPTGE was added dropwise to again give a clear solution which was allowed to age at room temperature. Solution samples were taken at different reaction times as the solution viscosity was increasing to generate variable film thicknesses at a constant spin coating speed of 1000 RPM on cleaned (deionized water, acetone rinses) silicon wafers. Films were dried under flowing nitrogen at room temperature. After curing on the wafers for 5 days, samples were peeled from the silicon wafers for SEM analysis. A reaction mixture that had aged for 30 minutes was found to produce a continuous thin film with thickness of 2-4 microns.

Ultra-thin film sorbents are produced via this spin coating procedure. The approach is applicable to a wide range of sorbent materials. Thin and ultra-thin films can be produced which can be controlled via modifications in polymer molecular weight, polymer concentration, solvent quality, solvent density, rotational rate, drying time, composition of drying gas and the like. In addition, cryo-grinding produces high surface area polymeric sorbents, especially in combination with the spin coating procedure. Furthermore, porogens can be added to the thin film sorbents to further increase sorbent surface area.

EXAMPLE 3

Figure 1:
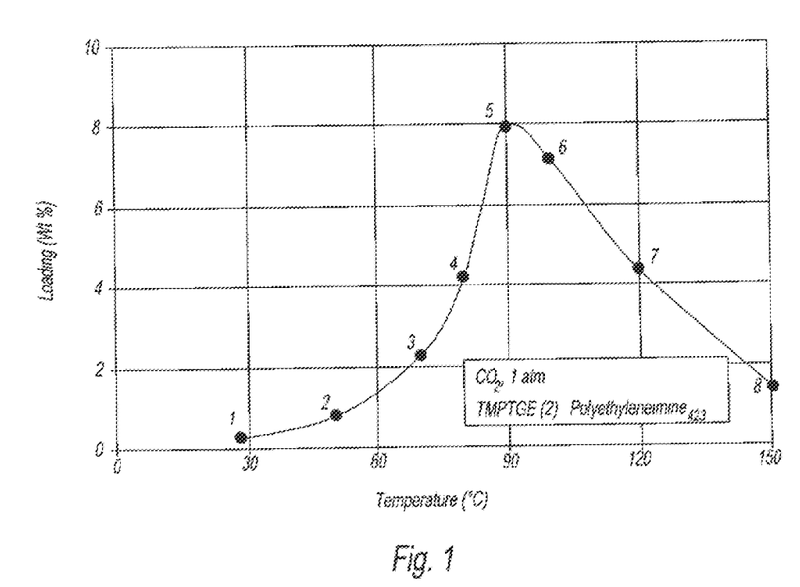
FIG. 1 graphically depicts gravimetric uptake of the adsorbent prepared in Example 2.

$CO_2$ absorption data was collected on the thin film product produced in Example 2 as a function of temperature at atmospheric pressure. The data is graphically depicted in FIG. 1. This material is highly effective at absorbing carbon dioxide at temperatures of 90° C.-100° C. The desorption of $CO_2$ was observed at higher temperatures. Absorption kinetics can be enhanced via smaller particle size and increased particle pore volume.

EXAMPLE 4

Starting Reagents
   DEO: Diepoxyoctane (Aldrich)
   Polyethylenituine (Mn=600, Aldrich)

Several epoxy/amine reactions were conducted involving the reaction of DEO and the polyethylenei mine in dimethylsulfoxide (DMSO) at the conditions listed below.

| Regents | Mole Ratio | Combined DEO + Polyethyleneimine concentration (wt %) | Reaction Temperature (° C.) | Gel Formation Time |
|---|---|---|---|---|
| DEO:Polyethyleneimine (600) | 3:1 | 10 | 25 | 21 days |
| DEO:Polyethyleneimine (600) | 3:1 | 20 | 25 | 10 days |
| DEO:Polyethyleneimine (600) | 3:1 | 10 | 50 | 5 days |
| DEO:Polyethyleneimine (600) | 3:1 | 20 | 50 | 1 day |
| DEO:Polyethyleneimine (600) | 3:1 | 10 | 75 | 2 days |
| DEO:Polyethyleneimine (600) | 3:1 | 20 | 75 | 5 hours |

Reaction Observations at 50° C.

At initial starting material concentrations, both 10 weight percent and 20 weight percent samples gave clear, colorless solutions. Within two hours at 50° C., a pale yellow color formed in both solutions, with greater intensity in the more concentrated solution. The 20 weight percent solution formed a gel in 1 day at 50° C., and the 10 weight percent solution gelled in 5 days at 50° C. Gelation times were found to decrease with increasing temperature, as shown above.

This approach is exemplary of a wide range of epoxy-polyamine reactions that can be produced in DMSO.

In addition, polyvinyl pyrrolidinone can be used as an effective porogen for this particular reaction. A wide variety of porogens can be used in this disclosure. However, the ability to extract the porogen from the polymeric sorbent matrix is important for the effective use of this particular aspect of the disclosure. Therefore, the porogen should remain soluble and extractable in common solvents, i.e., porogen should not react with the components forming the sorbent matrix. Alternative porogen structures include a wide range of polymeric structures produced via addition (e.g., polystyrene), condensation (e.g., polyesters and polyamides), cationic (e.g., butyl rubber), anionic (e.g., block copolymers), electron donating-electron accepting (e.g., styrene maleic anhydride) reaction schemes among other approaches. The DMSO can be extracted via a number of conventional extraction procedures such as exhaustive water extraction, freeze drying, vacuum distillation and other methodologies known to those versed in the art.

EXAMPLE 5

Figure 5:
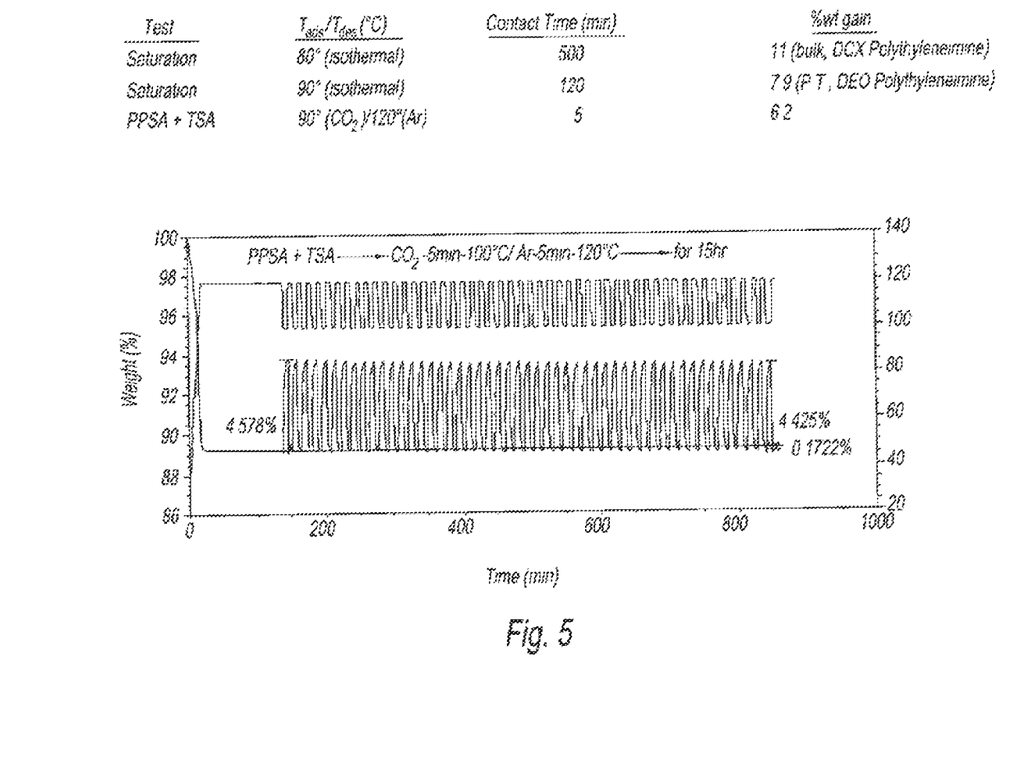
FIG. 5 shows data from repeatable and reversible $CO_2$ uptake at short cycle time.

FIG. 5 shows data from repeatable and reversible $CO_2$ uptake at short cycle time. Combining partial pressure swing adsorption (PPSA) and temperature swing adsorption (TSA) would enable the use of low pressure steam for purging.

DEO (diethyleneoxide)-polyethyleneimine exhibited good $CO_2$ uptake capacity at 90° C. (1.8 mmoles $CO_2$/g).

Figure 6:
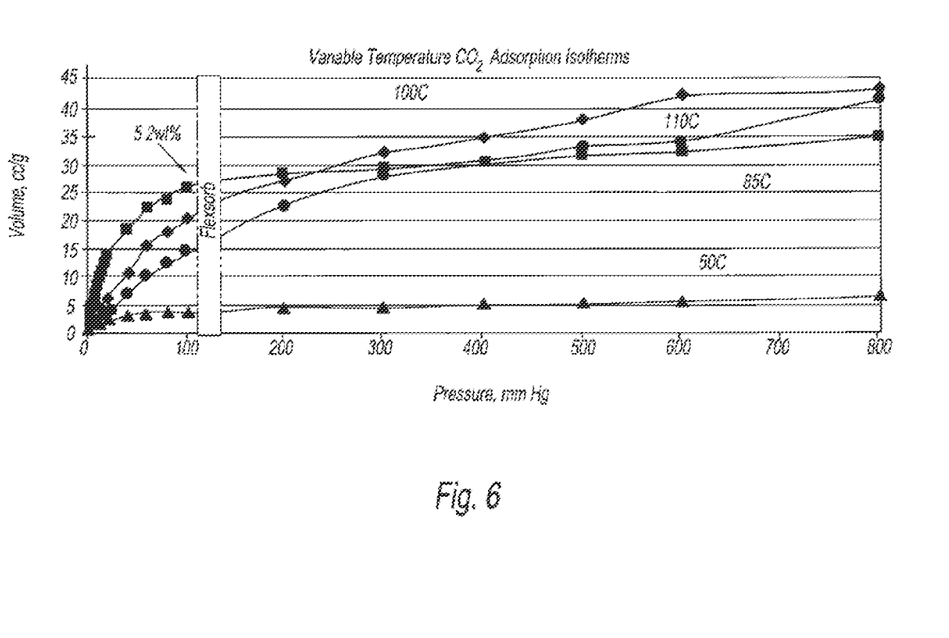
FIG. 6 graphically depicts variable temperature $CO_2$ adsorption isotherms.

FIG. 6 graphically depicts variable temperature $CO_2$ adsorption isotherms. The highest $CO_2$ uptake at low pressure was observed at 85° C.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. An acid gas adsorption-desorption material comprising a crosslinked epoxy-amine material having a weight average molecular weight of from about 500 to about $1 \times 10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material.

2. The acid gas adsorption-desorption material of claim 1 wherein said crosslinked epoxy-amine material is produced by reacting at least one epoxy functional compound, said at least one epoxy functional compound comprising a diepoxy functional compound, a triepoxy functional compound, a tetraepoxy functional compound, or mixtures thereof, with at least one amine, said at least one amine comprising a linear amine, a branched amine, a polyamine, or mixtures thereof, under conditions sufficient to produce said crosslinked epoxy-amine material.

3. The acid gas adsorption-desorption material of claim 2 wherein a monoepoxy functional compound is added to the reaction mixture.

4. The acid gas adsorption-desorption material of claim 2 wherein said at least one amine is comprised of a primary amine, a secondary amine, or mixtures thereof, and said crosslinked epoxy-amine material is comprised of a linear polyamine, a branched polyamine, or mixtures thereof.

5. The acid gas adsorption-desorption material of claim 2 wherein said at least one diepoxy functional compound is selected from the group consisting of: diglycidyl hexadecyl ether, and 1,2-epoxy-3-phenoxypropane; said at least one triepoxy functional compound is selected from the group consisting of: triphenylolmethane triglycidyl ether, and trimethylolpropane triglycidyl ether; said at least one tetraepoxy functional compound is selected from the group consisting of: tetraphenylolethane glycidyl ether; and mixtures thereof; and said at least one amine is selected from the group consisting of: propylenediamine, tetraethylenepentaamine, polyethyleneimines, and mixtures thereof.

6. The acid gas adsorption-desorption material of claim 3 wherein said monoepoxy functional compound is selected from the group consisting of: tetraphenylolethane glycidyl ether, bisphenol A (2,3-dihydroxypropyl glycidyl ether), dodecyl glycidyl ether, tetradecyl glycidyl ether, tert-butyl glycidyl ether, and glycidyl 2,2,3,3,4,4,5,5-octafluoropentyl glycidyl ether.

7. The acid gas adsorption-desorption material of claim 1 wherein said crosslinked epoxy-amine material is DEO (diethyleneoxide)-polyethyleneimine.

8. The acid gas adsorption-desorption material of claim 1 wherein said crosslinked epoxy-amine material has a formula selected from:

$$\{[CH_2CH_2NH]_x[CH_2CHOH(R)CHOHCH_2](NHCH_2CH_2)_y\}_n$$

wherein x is an integer greater than about 1.0, y is an integer greater than about 0, and n is an integer equal to or greater than about 1.0, the $CH_2CH_2NH$ and $NHCH_2CH_2$ groups can be linear or branched, and R is the same or different and is an alkyl or aryl moiety.

9. The acid gas adsorption-desorption material of claim 2 wherein said crosslinked epoxy-amine material is produced by adding a crosslinking agent selected from 2,4-bis(chloromethyl)-1,3,5-trimethylbenzene, 2,4,6-tris-(chloromethyl)-mesitylene, 1,3,5-tris-chloromethyl-2,4,6-trimethylbenzene, and mixtures thereof, to the reaction mixture of the epoxy functional compound and the amine.

10. The acid gas adsorption-desorption material of claim 1 wherein said crosslinked epoxy-amine material has an average particle diameter of from about 0.1 microns to about 500 microns.

11. An acid gas adsorption-desorption material comprising a linear epoxy-amine material having a weight average molecular weight of from about 140 to about $1 \times 10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material.

12. The acid gas adsorption-desorption material of claim 11 wherein said linear epoxy-amine material is produced by reacting at least one epoxy functional compound, said at least one epoxy functional compound comprising a diepoxy functional compound, a triepoxy functional compound, a tetraepoxy functional compound, or mixtures thereof, with at least one amine, said at least one amine comprising a linear amine, a branched amine, a polyamine, or mixtures thereof, under conditions sufficient to produce said linear epoxy-amine material.

13. The acid gas adsorption-desorption material of claim 12 wherein a monoepoxy functional compound is added to the reaction mixture.

14. The acid gas adsorption-desorption material of claim 12 wherein said at least one amine is comprised of a primary amine, a secondary amine, or mixtures thereof, and said linear epoxy-amine material is comprised of a linear polyamine, branched polyamine, or mixtures thereof.

15. The acid gas adsorption-desorption material of claim 12 wherein said at least one diepoxy functional compound is selected from the group consisting of: diglycidyl hexadecyl ether, and 1,2-epoxy-3-phenoxypropane; said at least one triepoxy functional compound is selected from the group consisting of; triphenylolmethane triglycidyl ether, and trimethylolpropane triglycidyl ether; said at least one tetraepoxy functional compound is selected from the group consisting of: tetraphenylolethane glycidyl ether; and mixtures thereof; and said at least one amine is selected from the group consisting of: propylenediamine, tetraethylenepentaamine, linear polyethyleneimines, and mixtures thereof.

16. The acid gas adsorption-desorption material of claim 13 wherein said monoepoxy functional compound is selected from the group consisting of: tetraphenylolethane glycidyl ether, bisphenol A (2,3-dihydroxypropyl glycidyl ether), dodecyl glycidyl ether, tetradecyl glycidyl ether, tert-butyl glycidyl ether, and glycidyl 2,2,3,3,4,4,5,5-octafluoropentyl glycidyl ether.

17. The acid gas adsorption-desorption material of claim 11 wherein said linear epoxy-amine material has a formula selected from:

$$\{[CH_2CH_2NH]_x[CH_2CHOH(R)CHOHCH_2](NHCH_2CH_2)_y\}_n$$

wherein x is an integer greater than about 1.0, y is an integer greater than about 0, and n is an integer equal to or greater than about 1.0, the $CH_2CH_2NH$ and $NHCH_2CH_2$ groups can be linear or branched, and R is the same or different and is an alkyl or aryl moiety.

18. The acid gas adsorption-desorption material of claim 11 wherein said linear epoxy-amine material has an average particle diameter of from about 0.1 microns to about 500 microns.

19. The acid gas adsorption-desorption material of claim 11 wherein said linear epoxy-amine material comprises a crosslinkable material.

20. A process for preparing an acid gas adsorption-desorption material comprising a crosslinked epoxy-amine material having a weight average molecular weight of from about 500 to about $1 \times 10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material; said process comprising (i) reacting at least one epoxy material with at least one amine material under conditions sufficient to produce an epoxy-amine material, and (ii) crosslinking said epoxy-amine material under conditions sufficient to produce said crosslinked epoxy-amine material.

21. The process of claim 20 which is carried out in the presence of at least one porogen.

22. The process of claim 21 wherein said at least one porogen is selected from the group consisting of: xylene, toluene, and polyvinylpyrrolidinone.

23. A process for preparing an acid gas adsorption-desorption material comprising a linear epoxy-amine material having a weight average molecular weight of from about 140 to about 1×10⁶, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material; said process comprising reacting an epoxy material with an amine material under conditions sufficient to produce said linear epoxy-amine material.

24. The process of claim 23 which is carried out in the presence of at least one porogen.

25. The process of claim 23 wherein said at least one porogen is selected from the group consisting of xylene, toluene, and polyvinylpyrrolidinone.

26. A method for adsorption-desorption of an acid gas comprising:
    contacting a gas mixture containing at least one acid gas with an adsorbent material under conditions sufficient to cause adsorption of at least a portion of said acid gas, said adsorbent material selected from the group consisting of: (i) a crossiiriked epoxy-amine material having a weight average molecular weight of from about 500 to about 1×10⁶, a total pore volume of from about 0.2 cubic centimeters per gram cc/g) to about 2.0 cc/g, and an adsorption capacity of at least about 0.2 millimoles of $CO_2$ adsorbed per gram of adsorbent material, and (ii) a linear epoxy-amine material having a weight average molecular weight of from about 140 to about 1×10⁶, and an adsorption capacity of at least about 0.2 millimoles of $CO_2$ adsorbed per gram of adsorbent material; and
    treating said adsorbent material under conditions sufficient to cause desorption of at least a portion of said acid gas.

27. The method of claim 26 wherein said acid gas comprises $CO_2$.

28. The method of claim 26 wherein the adsorption is carried out at a pressure of about 0.1 bar to about 300 bar, and a temperature greater than about 80° C.

29. The method of claim 28 wherein the desorption is carried out at a pressure of about 50 millibar to about 75 bar, and a temperature greater than about 80° C.

30. The method of claim 26 wherein the method is comprised of at least one process selected from the group consisting of: temperature swing adsorption, pressure swing adsorption, partial pressure swing adsorption, or by the use of a sweeping or purge gas, or any combination thereof.

31. The method of claim 26 wherein the gas mixture comprises $CO_2$ and at least one gas selected from the group consisting of: hydrocarbons, carbon monoxide, $H_2$, $O_2$, $N_2$, and combinations thereof.

32. The method of claim 31 wherein the gas mixture further comprises at least one hydrocarbon selected from the group consisting of: naphtha, methane, ethane, ethene, and combinations thereof.

33. A method of separating carbon dioxide from a gas mixture comprising;
    providing at least one adsorption zone comprising an adsorbent, said adsorbent selected from the group consisting of: (i) a cross linked epoxy-amine material having a weight average molecular weight of from about 500 to about 1×10⁶, a total pore volume of from about 0.2 cubic centimeters per gram (cc/g) to about 2.0 cc/g, and an adsorption capacity of at least about 0.2 millimoles of $CO_2$ adsorbed per gram of adsorbent material, and (ii) a linear epoxy-amine material having a weight average molecular weight of from about 140 to about 1×10⁶, and an adsorption capacity of at least about 0.2 millimoles of $CO_2$ adsorbed per gram of adsorbent material;
    passing said gas mixture comprising at least carbon dioxide through said at least one adsorption zone, wherein said adsorbent adsorbs at least part of the carbon dioxide from the mixture to provide a carbon dioxide-depleted gas; and
    regenerating said adsorbent by desorbing a carbon dioxide-rich gas.

34. The method of claim 33 wherein the adsorption is carried out at a pressure of about 0.1 bar to about 300 bar, and a temperature greater than about 80° C.

35. The method of claim 34 wherein the desorption is carried out at a pressure of about 50 millibar to about 75 bar, and a temperature greater than about 80° C.

36. The method of claim 35 wherein the passing and regenerating steps are carried out under essentially isothermal conditions.

\* \* \* \* \*